United States Patent [19]

Akao et al.

[11] Patent Number: 4,796,823
[45] Date of Patent: Jan. 10, 1989

[54] SPOOL FOR PHOTOGRAPHIC FILM

[75] Inventors: Mutsuo Akao; Hisao Endo; Toshio Sata; Masanori Ishiguro, all of Kanagawa, Japan

[73] Assignee: Fuji Photo Film Co., Ltd., Kanagawa, Japan

[21] Appl. No.: 88,224

[22] Filed: Aug. 24, 1987

[30] Foreign Application Priority Data

Aug. 25, 1986 [JP] Japan ................... 61-197085

[51] Int. Cl.$^4$ ............................................. B65H 75/18
[52] U.S. Cl. ................................... 242/71.8; 428/98; 428/120; 428/141
[58] Field of Search ................. 428/98, 120, 141; 354/275; 242/71.8; 206/316

Primary Examiner—Alexander S. Thomas
Attorney, Agent, or Firm—Burns, Doane, Swecker & Mathis

[57] ABSTRACT

A spool for a photographic film comprising 50 to 99.8 wt. % of polystyrene resin, 0.05 to 2.2 wt. % of dimethylpolysiloxane and/or modified dimethylpolysiloxane of which a part of methyl groups are substituted by carboxyalkyl groups, 0.5 to 6 wt. % of rubber and 0.05 to 3 wt. % of carbon black having a pH of 5 to 9 and a mean particle size of 10 to 120 m$\mu$, and the outer surface of the flange of the spool is made rough so that the reflectance of the incident light at an incident angle of 75 degrees is less than 40% in the direction of regular reflection at an angle of 75 degrees.

Static frictional coefficient of this spool against metal is small, and thereby photographic film can be drawn out of a photographic film cartridge smoothly to the last. Breakage of the perforations of photographic film does not occur. The outer surface of the flange of the spool is not glossy and its reflectance is low. Accordingly, the light passed through the space between end cap of cartridge and boss of spool does not reach the photographic film in the cartridge.

3 Claims, 2 Drawing Sheets

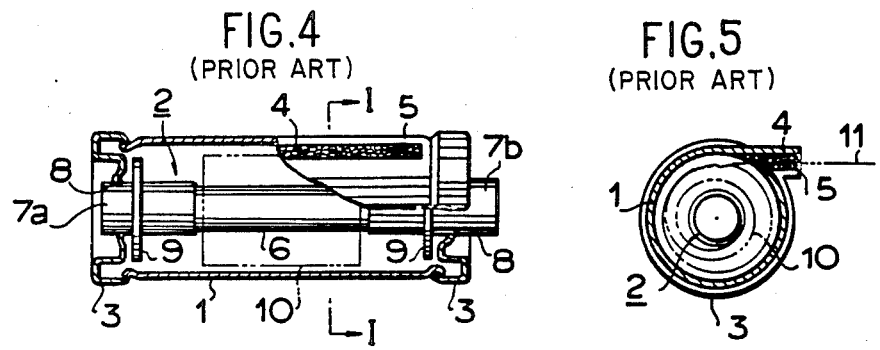
FIG.4 (PRIOR ART)
FIG.5 (PRIOR ART)
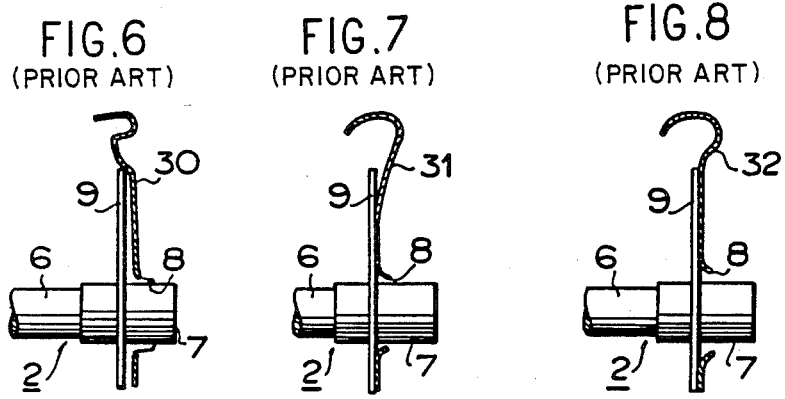
FIG.6 (PRIOR ART)
FIG.7 (PRIOR ART)
FIG.8 (PRIOR ART)

SPOOL FOR PROTOGRAPHIC FILM

BACKGROUND OF THE INVENTION

FIELD OF THE INVENTION

This invention relates to a spool of a photographic film cartridge for loading a roll film such as 16 mm film or 35 mm film.

DESCRIPTION OF PRIOR ART

The structure of a conventional photographic film cartridge is illustrated in FIGS. 4 and 5. As shown in these drawings, a spool 2 is inserted into a cylindrical body 1, and each end is fitted with a cap 3. A projecting port 5 for film is formed on the cylindrical body 1 in the longitudinal direction, and a pair of light-shielding ribbons 4 are stuck on the inside of the port 5. Bosses 7a and 7b are formed at both ends of the core 6 of the spool 2, and they are rotatably supported by the holes 8,8 formed in the center of the caps 3,3. Flanges 9,9 are integrally formed near the ends of the spool 2. The photographic film is coiled on the core 6, and it is drawn out from the port 5. The outside dimension and figure of the cartridge are specified by Japanese Standards JIS K-7528, etc., but its inside structure is not defined. Therefore, the inside structures of the cartridges are different according to each photographic film maker, and particularly, the form of the cap 3 has been devised in various viewpoints, such as to prevent the leak of light, to regulate the position of the spool 2, to support bosses 7a and 7b of the spool 2, and the like.

Some forms of conventional caps are illustrated in FIGS. 6 to 8. The cap 30 shown in FIG. 6 is in contact with the edge of the flange 9 of the spool 2, and its hole 8 portion is bent to project out of the cap 30. The edge of the hole 8 is also in contact with the surface of the boss 7. In the cap 31 shown in FIG. 7, the hole 8 is made large, and in order to shield the light entered through the hole 8, the wall of the cap 31 around the hole 8 is in contact with the intermediate part of the flange 9. In the cap 32 shown in FIG. 8, the hole 8 is also made large, and in order to shield the light, almost the whole outer face of the flange 9 is in contact with the cap 32. In the case of the cap 30 of FIG. 6, precise forming is required, and nevertheless, the positioning of the spool 2 and light-shielding become insufficient. Therefore, the cap 31 of FIG. 7 or the cap 32 of FIG. 8 has generally been used. However, in these caps, a large frictional resistance is generated upon drawing out the photographic film because of the broad contact area between the flange 9 and the cap 31 or 32. The play between the edge of the hole 8 and the boss 7 of the spool 2 also interferes with smooth rotation of the spool 2. As a result, appreciably large force is required to draw out the photographic film 10 in the case of using the cap 31 or 32, and in an extreme case, film perforations are broken as film is advanced in a camera. Generally, the load tension of the last drawing out of the photographic film is usually the largest, and the above breakage occurs at this time.

As the means to prevent the breakage of film perforations, Japanese Utility Model KOKOKU No. 61-3000 discloses a photographic film cartridge where either or both of the contact faces of the spool 2 or the cap are made slippery. In this cartridge, a lubricant is dissolved in an organic solvent having a low boiling point, and coated on the outside surfaces of the flange 9 and the boss 7, as shown in FIG. 3, by using a brush, a spray gun or immersion coating to form a lubricant layer 12.

However, in such a conventional means, an expensive explosion proof room is necessary and the coating process is troublesome, because of using the flammable organic solvent.

SUMMARY OF THE INVENTION

An object of the invention is to provide a spool for a photographic film having a low frictional resistance and capable of reducing the load tension upon drawing out the photographic film which is produced without using a flammable organic solvent.

Another object of the invention is to provide a spool for a photographic film which is excellent in shielding light from passing through the hole for the support of the spool.

Another object of the invention is to provide a spool for a photographic film of which molding, particularly separation from its mold, is easy.

The present invention has been made in order to achieve such objects, and it is characterized by the spool itself being made slippery by blending a definite amount of a particular lubricant, i.e. dimethylpolysiloxane and/or carboxyl-modified silicone oil, and the outer surface of its flange is made rough.

Thus, the present invention provides a spool for a photographic film comprising 50 to 99.8 wt. % of polystyrene resin, 0.05 to 2.2 wt. % of dimethylpolysiloxane and/or modified dimethylpolysiloxane of which a part of the methyl groups are substituted by carboxyalkyl groups, 0.5 to 6 wt. % of rubber and 0.05 to 3 wt. % of carbon black having a pH of 5 to 9 and a mean particle size of 10 to 120 m$\mu$, and the outer surface of the flange of the spool is made rough so that the reflectance of the incident light at an incident angle of 75 degrees is less than 40% in the direction of regular reflection at an angle of 75 degrees.

BRIEF DESCRIPTION OF THE DRAWINGS

FIG. 4 is a side view of a photographic film cartridge of which most part is broken away, and FIG. 5 is a sectional view taken on line I—I of FIG. 4.

FIGS. 6 to 8 are partial sectional views showing the structures between spool and some conventional caps of photographic film cartridge.

DETAILED DESCRIPTION OF THE INVENTION

Figure 1:
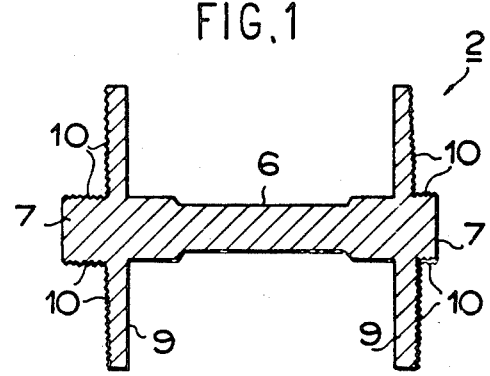
FIG. 1 is a sectional view of a spool embodying the invention.

Dimethylpolysiloxane and/or modified dimethylpolysiloxane in which a part of the methyl groups are substituted by carboxyalkyl groups that are added in order to raise slipping character of the surface of spool and to lower its frictional resistance. Other lubricants are not suitable for the spool of the invention. For example, fluorosilicone oils and fluorine modified silicone oils are not suitable, though it is described in the catalogs of silicone manufacturing makers that their frictional coefficients are very small and slipping character is remarkably improved by blending them. When spools were formed by using polystyrene resins containing them, the drawing out load tensions of photographic film were not so different from products that do not contain such oils. Various other silicone oils are not suitable because of adverse influence upon photographic films.

Dimethylpolysiloxane has the following formula:

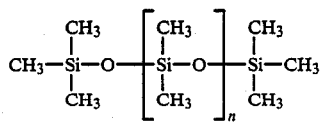

Such dimethylpolysiloxane is manufactured by silicone oil manufacturing companies, such as SHINETSU CHEMICAL, TOSHIBA SILICONE, TORAY SILICONE, UNION CARBIDE, DOW CORNING, etc. A preferable dimethylpolysiloxane has a kinematic viscosity of 1,000 to 60,000 centistokes at 25° C. When the viscosity is lower than 1,000 centistokes, bleed out becomes a problem, and it adversely affects photographic films. While, when the viscosity is higher than 60,000 centistokes, miscibility to polystyrene resin decreases. Lubrication is also inferior.

Modified dimethylpolysiloxane in which a part of the methyl groups are substituted by carboxyalkyl groups (carboxyl-modified silicone oil) is also manufactured by various silicone oil manufacturing companies. The carboxyl-modified silicone oil having the following formula is preferable.

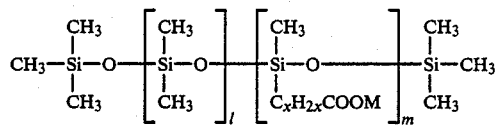

Miscibility of this carboxyl-modified silicone oil with polystyrene resin is excellent, and slipping character can greatly be improved by a small amount of this silicone oil. The charging time of the blended resin can also be shortened. Suitable kinematic viscosity is similar to that of dimethylpolysiloxane.

The content of dimethylpolysiloxane and/or carboxyl-modified silicone oil is 0.05 to 2.2 wt. %. When the content is less than 0.05 wt. %, slipping character becomes insufficient. While, when the content is more than 2.2 wt. %, these lubricants adversely affect photographic films similar to other silicone oil lubricants. Metering of the resin amount becomes inaccurate because of screw slip, and charging time of the blended resin becomes longer which extends the molding cycle. Nevertheless, slipping character is almost the same as the case of 2.2 wt. %.

The rubber lowers the gloss of the polystyrene resin, and it raises the impact strength of polystyrene resin. The rubber is, in general, selected from synthetic rubbers, and, for example, butadiene rubber is suitable. The rubber may be blended prior to or at the time of polymerization of styrene to produce high-impact polystyrene (HIPS) resin or medium-impact polystyrene (MIPS) resin, or it may also be blended into general purpose polystyrene (GPPS). MIPS and blended resin of HIPS and GPPS are preferred. The content of the rubber is 0.5 to 6 wt. %. When the content is less than 0.5 wt. %, physical strength and surface strength for the prevention of scratches and abrasion become insufficient. While, when the content is more than 6 wt. %, injection moldability, rigidity and appearance become problems.

The carbon black imparts or improves physical strength, light-shielding, antistatic property and mat. Furnace carbon black having a pH of 5 to 9 and a mean particle size of 10 to 120 m$\mu$ is preferable because of excellent light-shielding and not giving bad influences such as fogging, variation of light sensitivity and adhesion, upon photographic film. Particularly preferable carbon black is oil furnace carbon black having a pH of 6 to 8 and a mean particle size of 15 to 50 m$\mu$. In order to improve antistatic property, it is preferable that the above furnace carbon black is combined with a conductive light-shielding material such as conductive carbon black including acetylene carbon black and Ketschen carbon black, metal fiber, carbon fiber or metal powder. Even in such case, more than 50% of light-shielding material should be furnace carbon black. The content of the furnace carbon black in the blended resin is 0.05 to 3 wt. %. When the content is less than 0.05 wt. %, light-shielding becomes insufficient. While, when the content is more than 3 wt. %, physical strength of spool lowers, and weld lines are generated. Moreover, the spool becomes hygroscopic, and it adversely affects photographic films.

The blending method of dimethylpolysiloxane, carboxyl-modified silicone oil, rubber and carbon black is not limited, and may be a compound coloring method, powder blending method, masterbatch method, liquid method or the like. Among them, the masterbatch method is preferable in points of cost and clear process. A masterbatch may be produced for any or all of dimethylpolysiloxane, carboxyl-modified silicone oil, rubber, rubber-containing polystyrene resin and carbon black. The resin for the masterbatch is polystyrene resin or a thermoplastic resin easily blendable with polystyrene resin such as polyolefin resin. Preferable polyolefin resins are ethylene-ethylacrylate copolymer (EEA) resin, ethylene-methylacrylate copolymer (EMA) resin, ethylene-vinylacetate copolymer (EVA) resin, linear low-density polyethylene (L-LDPE) resin, high-pressure branched low-density polyethylene (LDPE) resin, ethylene-acrylic acid copolymer (EAA) resin and the like. The melt index of the masterbatch resin is preferably higher than polystyrene resin as the main resin.

Various additives may be added to the resin composing the spool of the invention. Such additives include antioxidant, light stabilizer, ultraviolet absorber, nucleating agent, antistatic agent, pigment, pigment dispersing agent, lubricant, neutralizer, acid trapping agent, dye and metal powder. The polyolefin resin or elastomer may also be blended. Moreover, blending of other lubricants including various silicone oil, antiblocking agent, silicone dioxide or pigment is effective in improving injection moldability and last torque. Since the resin composing the spool of the invention contains dimethylpolysiloxane and/or carboxyl-modified silicone oil and carbon black, the blending of antioxidant is not essential for inhibiting oxidation of the rubber. However, the addition of the antioxidant is preferable in order to continue injection molding for a long period without coloring trouble or to perform injection molding at a high temperature. Suitable antioxidants are phenol compounds and phosphorus compounds. Whereas, sulfur compounds and amine compounds are not suitable because of adverse effecting upon photographic films. The suitable content of the antioxidant is 0.01 to 1 wt. %. Since photographic film utilizes oxidation-reduction reaction, blending of more than 1 wt. % adversely affects photographic films even though phenol or phosphorus antioxidant is employed. The blending of silicone dioxide not only improves the drawing out frictional resistance together with dimethylpolysiloxane and/or carboxyl-modified silicone oil but also improves deterioration of the resin charge at injection molding caused by dimethylpolysiloxane and/or carboxyl-modified silicone oil. The suitable content is 0.05 to 2.2 wt. %. In the case that the content is less than 0.05 wt. %, the above effects become insufficient. While, in the case that the content is more than 2.2 wt. %, the blending effect by the supplementary amount is little, and the surface of spool becomes rough to increases frictional resistance.

By blending dimethylpolysiloxane and/or carboxyl-modified silicone oil, the problem of load tension could be solved. However, fogging troubles happened to the photographic film in a photographic film cartridge. Then, the present inventors further investigated, and they found that the fogging occurred by the gloss of the spool surface caused by blending dimethylpolysiloxane and/or carboxyl-modified silicone oil. Thus, they have made the outer surface of the flange of the spool rough such as by embossing, and thereby they have solved this fogging problem, too. The roughness is made so that the reflectance of the incident light at an incident angle of 75 degrees is less than about 40% in the direction of regular reflection at an angle of 75 degrees. When this reflectance is beyond about 40%, fogging of the photographic film loaded in a cartridge occurs. Shape and size of each pattern forming the roughness are not limited, however the depth of embossed pattern is preferably shallower than 50 μm, such as 10 to 50 μm. Samples of the roughness patterns usable for the invention are summarized in etching sample plates of NIHON ETCHING CORP. LTD. and "BEALON SHIBO" of TOKYO BEALON CORP. LTD.

The spool for a photographic film of the invention is composed of polystyrene resin containing prescribed amounts of dimethylpolysiloxane and/or carboxyl-modified silicone oil, rubber and carbon black and the frictional resistance outer surface of its flange to drawing out a photographic film is remarkably lowered. Izod impact strength is also raised. Besides, the surface of the spool is not so glossy, and its reflectance is low. Accordingly, the light passed through the space between end cap of cartridge and boss of spool does not reach the photographic film in the cartridge. Charging time of molten resin for molding can be shortened, and thereby the molding cycle is also shortened. Separability of the molded spool from its mold is also acceptable.

From the foregoing, fogging of the edge of photographic film is prevented. Breakage of the perforations of photographic film does not occur, because the photographic film can be drawn out smoothly to the last. In the case of the camera equipped with an automatic winding mechanism of photographic film, consumption of the electrical cell can be saved.

EXAMPLES

An example of the spool of the invention is shown in FIG. 1.

This spool is constituted by core 6 and two flanges 9,9 and bosses 7,7 formed on both ends of the core 6. Such a spool is made of the resin defined in the present specification, and the outer surface of the flanges 9,9 and peripheral surface of the bosses 7,7 are made rough by a fine embossing 10.

Ten kinds of the spool of the invention were produced by using the resins having various compositions shown in Table 1. Various properties of the spools were measured, and compared with several conventional products and comparative products as shown in Table 2.

Each molding was carried out by using the molding machine "NESTAL" (trade name, manufactured by SUMITOMO HEAVY INDUSTRIES LTD.) at mold clamping pressure of 150 tons.

The dimethylpolysiloxane employed was "KF-96H" (trade name, manufactured by SHINETSU CHEMICAL CO., LTD., viscosity; 10,000 centistokes at 25° C., specific gravity; 0.97–0.98 g/cm$^3$), and the carboxyl-modified silicone oil employed was "X-22-3701E" (trade name, manufactured by SHINETSU CHEMICAL CO., LTD., viscosity; 3,000 cps at 25° C., specific gravity; 0.98 g/cm$^3$, carboxyl equivalent weight; 3,800).

TABLE 1

| | Resin Composition (Wt. %) | | | | |
|---|---|---|---|---|---|
| | Polystyrene Resin | Rubber | Furnace Carbon Black | Lubricant (Kind) | |
| INVENTION | | | | | |
| 1 | 96.7 | 1.8 | 0.5 | (KF-96) | 1.0 |
| 2 | " | " | " | " | " |
| 3 | " | " | " | " | " |
| 4 | " | " | " | " | " |
| 5 | " | " | " | " | " |
| 6 | " | " | " | " | " |
| 7 | " | " | " | " | " |
| 8 | " | " | " | " | " |
| 9 | " | " | " | " | " |
| 10 | " | " | " | (X-22-3701E) | " |
| COMPARATIVE | | | | | |
| 1 | 96.7 | 1.8 | 0.5 | (KF-96) | 1.0 |
| 2 | " | " | " | " | 2.0 |
| 3 | " | " | " | (Erucic Amide) | 1.0 |
| 4 | " | " | " | (X-22-3701E) | 1.0 |
| CONVENTIONAL | | | | | |
| 1 | " | " | " | * | |
| 2 | " | " | " | None | |

Figure 3:
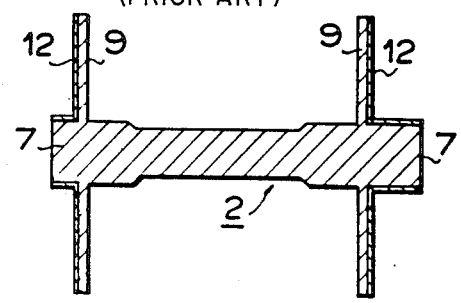
FIG. 3 is a sectional view of a conventional spool.

*A lubricant was coated as shown in FIG. 3.

TABLE 2

| Outer Surface of Flange | Reflection | Static Frictional Co-efficient | Last Torque | Izod Impact Strength | Fogging |
|---|---|---|---|---|---|
| INVENTION | | | | | |
| 1 | HN-25* | 0.5 | 0.14 | A | B-A | A |
| 2 | HN-30 | 1.0 | 0.15 | " | " | " |
| 3 | HN-26 | 1.1 | 0.12 | " | " | " |
| 4 | HN-1007 | 6.0 | 0.15 | " | " | " |
| 5 | HN-1015 | 7.8 | 0.15 | " | " | " |
| 6 | HN-1001 | 14.9 | 0.14 | " | " | B-A |
| 7 | HN-1012 | 15.8 | 0.14 | " | " | " |
| 8 | HN-1005 | 22.2 | 0.16 | B-A | " | " |
| 9 | HN-1003 | 29.5 | 0.10 | A | " | B |
| 10 | " | 31.3 | 0.08 | " | " | " |
| COMPARATIVE | | | | | |
| 1 | Flat | 51.6 | 0.18 | B | B-A | D |
| 2 | " | 52.6 | 0.16 | B-A | B | D |
| 3 | " | 53.3 | 0.32 | E | C | E-D |
| 4 | " | 52.3 | 0.15 | A | B-A | D |
| CONVEN- | | | | | |

TABLE 2-continued

| TIONAL | | | | | | |
|---|---|---|---|---|---|---|
| 1 | " | 41.4 | 0.18 | B | C | C |
| 2 | " | 51.0 | 0.25 | E | C | C |

Evaluations in Table 2 were carried out as follows;
A   very excellent      B   excellent
C   practical               D   having a problem
E   impractical

*Abbreviations shown in the column of Outer Surface of Flange are the crimp sample numbers of NIHON ETCHING CORP. LTD.

Reflection:

Measured by using a reflection gloss meter (manufactured by MURAKAMI COLOR RESEARCH LABORATORY) at an incident angle of 75 degrees and at a light-receiving angle (measuring angle) of 105 degrees (75 degrees in the direction of regular reflection).

Static Friction Coefficient:

Each test piece was prepared by molding in a size of 75 mm length × 35 mm width. One piece was stuck on the underside of a metal block having the same size and weighing 100 g. Another test piece was stuck on an inclined face, and the above block was place on it. The inclined angle was increased, and the angle ($\theta$) where the block began to slip was read. The coefficient is represented by tan $\theta$.

Figure 2:
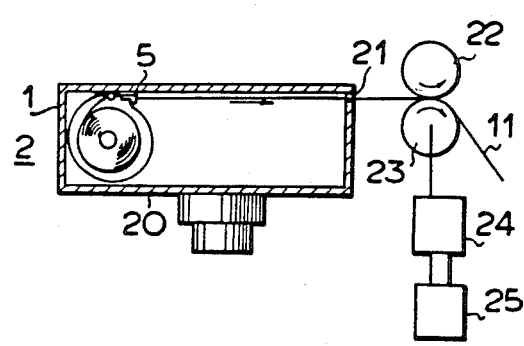
FIG. 2 is a diagrammatic illustration of a load tension measuring apparatus.

Last Torque:

Measured by using the apparatus shown in FIG. 2. A 35 mm photographic film cartridge containing 36 exposures film "FUJI COLOR HR-100") was loaded in a camera 20, and 11 of the film 10 was drawn out of the camera through the slot 21 provided on the opposite corner of the camera. This film 10 was passed though nip rolls 22, 23. A motor 25 was connected to one nip roll 23 through a torque pick up 24 ("TDM-3S", manufactured by DENSI KOGYO K.K.). The motor 25 was driven at a constant speed, and the film 10 was drawn out to the last at a speed of 40 mm/sec. The last torque value was measured by the torque pick up 24, and converted into tension.

Izod Impact Strength:

JIS K 7110 (measured at 23° C.)

Fogging:

A color photographic negative film of ISO 100 ("FUJI COLOR HR 100") was coiled on each exemplified spool, and placed in a JIS 135-type photographic film cartridge shown in FIGS. 4 and 5. The port 5 was completely shielded from light, and the cartridge was stood so that the side of boss 7a was faced upward. This cartridge was exposed to the light of 80,000 luxes for 1 hour. Then, the cartridge was turned, and stood so that the side of boss 7b was faced upward. The cartridge was further exposed to the 80,000 luxes light for 1 hour. The film was developed, and fogging degree of the side edges was observed.

We claim:

1. A spool for a photographic film comprising 50 to 99.8 wt. % of polystyrene resin, 0.05 to 2.2 wt. % of at least one member selected from the group consisting of dimethylpolysiloxane and modified dimethylpolysiloxane of which a part of the methyl groups are substituted by carboxylalkyl groups, 0.5 to 6 wt. % of rubber and 0.05 to 3 wt. % of carbon black having a pH of 5 to 9 and a mean particle size of 10 to 120 m, and the outer surface of the flange of the spool is made rough so that the reflectance of the incident light at an incident angle of 75 degrees is less than 40% in the direction of regular reflection at an angle of 75 degrees.

2. The spool of claim 1 wherein the kinematic viscosity of said dimethylpolysiloxane and said modified dimethylpolysiloxane is 1,000 to 60,000 centistokes at 25° C.

3. The spool of claim 1 wherein the roughness of said outer surface of the flange is formed by embossing having a depth of shallower than 50 $\mu$m.

* * * * *